(12) United States Patent
Welles et al.

(10) Patent No.: US 7,178,817 B1
(45) Date of Patent: Feb. 20, 2007

(54) TRAILING ARM SUSPENSION SYSTEM

(75) Inventors: Terry Welles, Elkhart, IN (US); Mahlon T Bontrager, Goshen, IN (US)

(73) Assignee: Monaco Coach Corporation, Elkhart, IN (US)

( * ) Notice: Subject to any disclaimer, the term of this patent is extended or adjusted under 35 U.S.C. 154(b) by 0 days.

(21) Appl. No.: 10/286,075

(22) Filed: Nov. 1, 2002

(51) Int. Cl.
*B60G 3/12* (2006.01)

(52) U.S. Cl. .................. 280/124.128; 280/124.13; 280/124.137; 280/124.149

(58) Field of Classification Search ......... 280/124.128, 280/124.13, 124.134, 124.35, 124.153, 124.106, 280/124.135, 124.149, 124.137
See application file for complete search history.

(56) References Cited

U.S. PATENT DOCUMENTS

| | | | |
|---|---|---|---|
| 3,547,215 A * | 12/1970 | Bird | 280/86.75 |
| 4,193,612 A | 3/1980 | Masser | |
| RE30,308 E | 6/1980 | Masser | |
| 4,262,929 A | 4/1981 | Pierce | |
| 4,273,357 A * | 6/1981 | Pashkow | 280/124.116 |
| 4,322,061 A | 3/1982 | Masser | |
| 4,379,572 A * | 4/1983 | Hedenberg | 280/86.75 |
| 4,405,154 A | 9/1983 | Masser | |
| 4,595,216 A | 6/1986 | Ware | |
| 4,615,539 A | 10/1986 | Pierce | |
| 4,634,141 A | 1/1987 | Hagan et al. | |
| 4,678,041 A * | 7/1987 | Staudinger | 169/24 |
| 4,693,486 A | 9/1987 | Pierce et al. | |
| 4,700,968 A | 10/1987 | Cherry | |
| 4,705,294 A * | 11/1987 | Raidel | 280/124.116 |
| 4,726,571 A | 2/1988 | Smith et al. | |
| 4,729,579 A | 3/1988 | Hagan et al. | |
| 4,736,958 A | 4/1988 | Armstrong | |
| 4,854,409 A | 8/1989 | Hillebrand et al. | |
| 4,858,949 A | 8/1989 | Wallace et al. | |
| 4,991,872 A | 2/1991 | Richardson | |
| 5,058,916 A | 10/1991 | Hicks | |
| 5,058,917 A | 10/1991 | Richardson | |
| 5,083,812 A * | 1/1992 | Wallace et al. | 280/124.106 |
| 5,088,763 A | 2/1992 | Galazin et al. | |
| 5,112,078 A | 5/1992 | Galazin et al. | |
| 5,116,075 A | 5/1992 | Pierce | |
| 5,192,101 A | 3/1993 | Richardson | |
| 5,201,898 A | 4/1993 | Pierce | |
| 5,203,585 A | 4/1993 | Pierce | |
| 5,288,100 A | 2/1994 | Cherry et al. | |
| 5,315,918 A | 5/1994 | Pierce | |
| 5,333,645 A | 8/1994 | Galazin | |
| 5,335,695 A | 8/1994 | Pierce | |
| 5,335,696 A | 8/1994 | McKenzi | |
| 5,335,932 A | 8/1994 | Pierce | |
| 5,375,819 A | 12/1994 | Galazin | |

(Continued)

*Primary Examiner*—Paul N. Dickson
*Assistant Examiner*—Toan C. To
(74) *Attorney, Agent, or Firm*—Baker & Daniels LLP (57) ABSTRACT

A vehicle suspension system includes a trailing arm, an air spring, and a shock absorber for providing a smooth ride in a vehicle. A bracket pivotally mounts one end of the trailing arm to the frame of the vehicle while the other end of the trailing arm is joined to the frame by a shock absorber and an air spring. The shock absorber and the air spring both extend from the trailing arm to the frame and mount to the trailing arm at a position rearward of the axle. The shock absorber is mounted to the trailing arm rearward of the air spring.

12 Claims, 8 Drawing Sheets

U.S. PATENT DOCUMENTS

| | | | |
|---|---|---|---|
| 5,393,096 A | 2/1995 | Pierce et al. | |
| 5,413,374 A | 5/1995 | Pierce | |
| 5,470,096 A * | 11/1995 | Baxter | 280/124.116 |
| 5,649,719 A * | 7/1997 | Wallace et al. | 280/124.156 |
| 5,785,345 A * | 7/1998 | Barlas et al. | 280/124.165 |
| 6,135,470 A * | 10/2000 | Dudding | 280/124.128 |
| 6,224,074 B1 * | 5/2001 | Cadden | 280/86.75 |
| 6,257,597 B1 | 7/2001 | Galazin | |
| 6,276,710 B1 * | 8/2001 | Sutton | 280/678 |
| 6,286,857 B1 * | 9/2001 | Reese et al. | 280/683 |
| 6,328,322 B1 | 12/2001 | Pierce | |
| 6,527,286 B2 * | 3/2003 | Keeler et al. | 280/124.135 |
| 6,688,612 B1 * | 2/2004 | Burdock et al. | 280/5.502 |
| 6,702,325 B1 * | 3/2004 | Pierce | 280/788 |
| 6,733,020 B2 * | 5/2004 | Reineck | 280/124.107 |
| 6,886,840 B2 * | 5/2005 | Reineck | 280/124.107 |
| 6,959,932 B2 * | 11/2005 | Svartz et al. | 250/5.514 |

* cited by examiner

TRAILING ARM SUSPENSION SYSTEM

BACKGROUND OF THE INVENTION

1. Field of the Invention

The present invention relates to a trailing arm vehicle suspension system for use in motor vehicles.

2. Description of Prior Art

Various suspension systems for use with motor vehicles have been in use for many years. For example, U.S. Pat. No. 4,615,539 discloses a suspension for automotive vehicles for joining ground engaging wheels to the frame of a vehicle. This suspension includes rigid trailing arms secured to the frame through pivot mounts. An air spring is also included in the suspension and is located at a load transmitting location between one of the trailing arms and the frame.

A second example of a known suspension system is shown in U.S. Pat. No. 4,858,949 which discloses a lightweight trailing arm suspension adapted to support a vehicle on ground engaging wheels. A rigid trailing arm is mounted to the frame by way of a bracket attached to one end of the trailing arm. An air spring assembly is mounted to the other end. The air spring assembly is adapted to cushion the swinging movement of the trailing arm as it pivots about the bracket.

U.S. Pat. No. 5,203,585 represents another example of a known suspension. This patent discloses a split-beam suspension system. The suspension system includes a split-beam trailing arm which is pivotally secured at one end to the vehicle frame to allow for vertical swinging. The other end of the trailing arm supports an air spring assembly. A shock absorber also extends from the trailing arm to the frame and is located at a point between the air spring and the pivotable mounting.

SUMMARY OF THE INVENTION

The present invention comprises a vehicle suspension system for mounting ground engaging wheels to the vehicle frame. The vehicle suspension system includes a trailing arm having a first end pivotally mounted to the vehicle frame by way of a bracket. At the opposite end of the trailing arm, a shock absorber extends from the trailing arm to the frame. An axle is also affixed to the trailing arm with the ground engaging wheel being connected thereto. Additionally, an air spring also extends from the trailing arm to the frame with the air spring being mounted forward of the shock absorber.

In addition, the vehicle suspension system also includes a transverse beam mounting bracket on the front suspension system arranged to apply the force from the transverse beam to the lowest portion of the trailing arm as possible, while allowing the transverse beam to be located vertically above the trailing arm. The rear suspension system includes a transverse beam mounting bracket which positions the transverse beam to a location vertically below the trailing arm. This has the affect of lowering the center of gravity of the suspension and moving the force resisting any sway as far from the frame as possible.

The vehicle suspension system further includes an air valve which is mounted to the frame. The air valve includes hoses connecting the valve to the air spring and a leveling arm for measuring the height of the trailing arm relative to the frame. The air valve may increase and decrease the air pressure within the air spring, as needed, to ensure a level ride to a passenger in the coach.

In an alternative embodiment, the rear suspension may also include a bracket affixed to the trailing arm which joins the trailing arm with both the shock absorber and the transverse beam. In this embodiment, the shock absorber is still retained at a position rearward of the air spring and the transverse beam is retained at a position below the trailing arm.

Additional features of the present invention will become apparent from the detailed description contained herein. However, it should be understood that the detailed description and specific examples, while indicating certain embodiments of the invention, are given by way of illustration only, since various changes and modifications within the spirit and scope of the invention will be apparent to those skilled in the art.

DETAILED DESCRIPTION OF EMBODIMENTS OF THE INVENTION

The embodiments of the invention described herein are not intended to be exhaustive, nor to limit the invention to the precise forms disclosed. Rather, the embodiments selected for description have been chosen to enable one skilled in the art to practice the invention.

Figure 1:
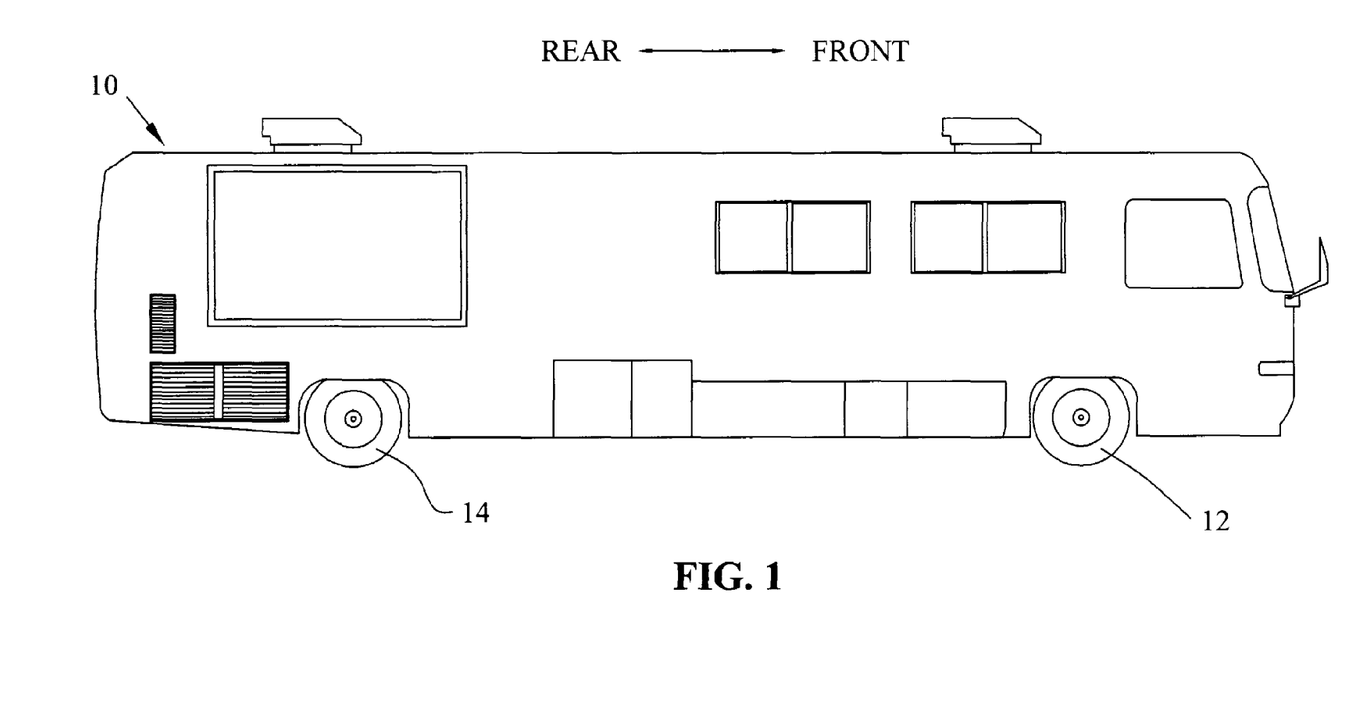
FIG. 1 is a side view of a recreational vehicle including an embodiment of a suspension system according to the present invention.
Figure 2:
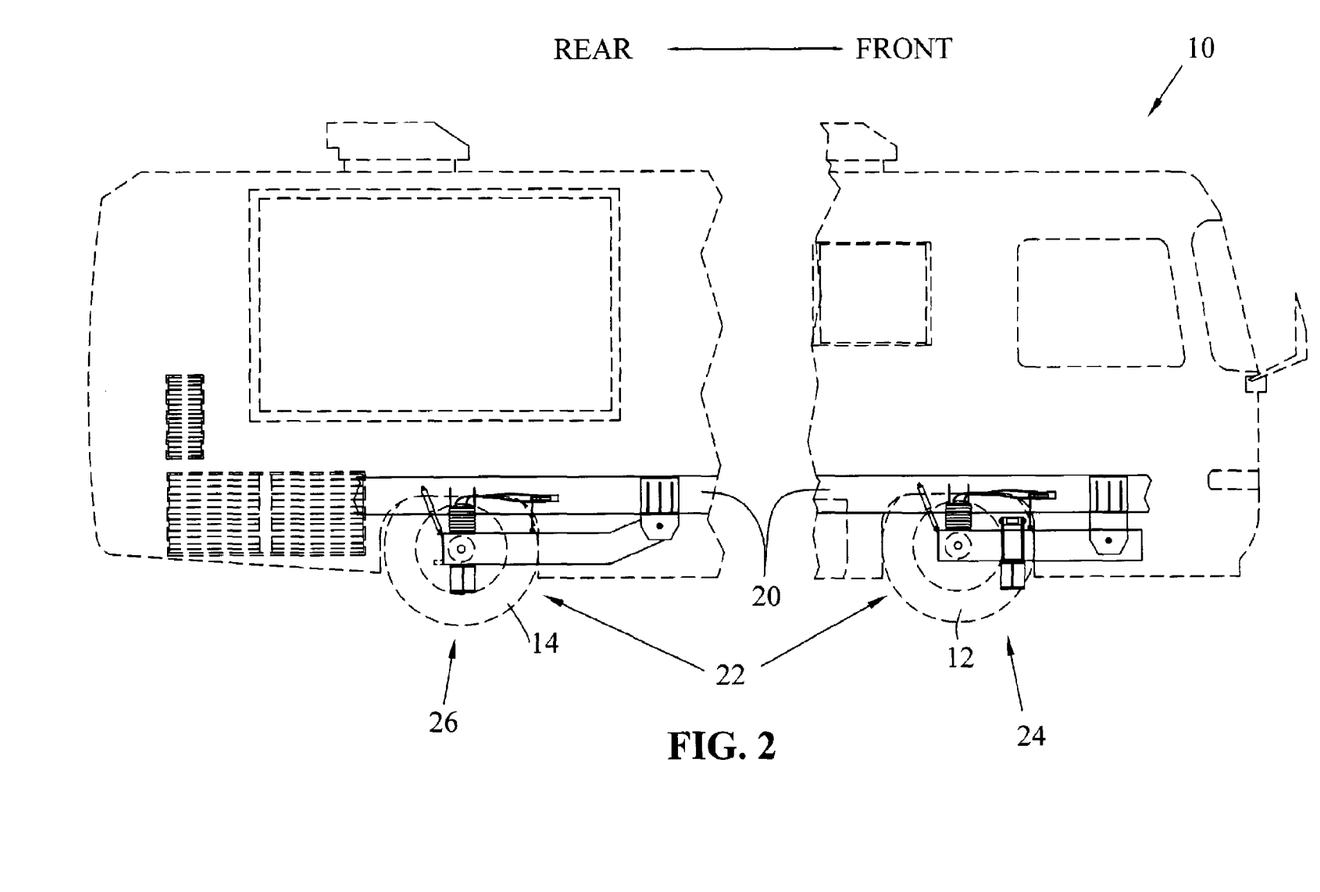
FIG. 2 is a side view of the recreational vehicle depicted in FIG. 1 showing the front and rear suspension.

Referring to the drawings and particularly to FIGS. 1 and 2, these Figures depict a vehicle generally indicated by numeral 10, having front wheels 12 and rear wheels 14, as is commonly employed in the art. Vehicle 10 may be of any type well known, such as a car, truck or van. However, for illustrative purposes only, the vehicle depicted in FIGS. 1 and 2 is the type commonly known as a recreational vehicle.

FIG. 2 shows a frame 20 for supporting the body of the vehicle 10. The frame 20 is coupled to the front wheels 12 and the rear wheels 14 by way of a suspension system generally indicated by numeral 22. The suspension system 22 includes a front suspension 24 and a rear suspension 26, with the front suspension 24 coupling the front wheels 12 to the frame 20 and the rear suspension 26 coupling the rear wheels 14 to the frame 20.

Figure 3:
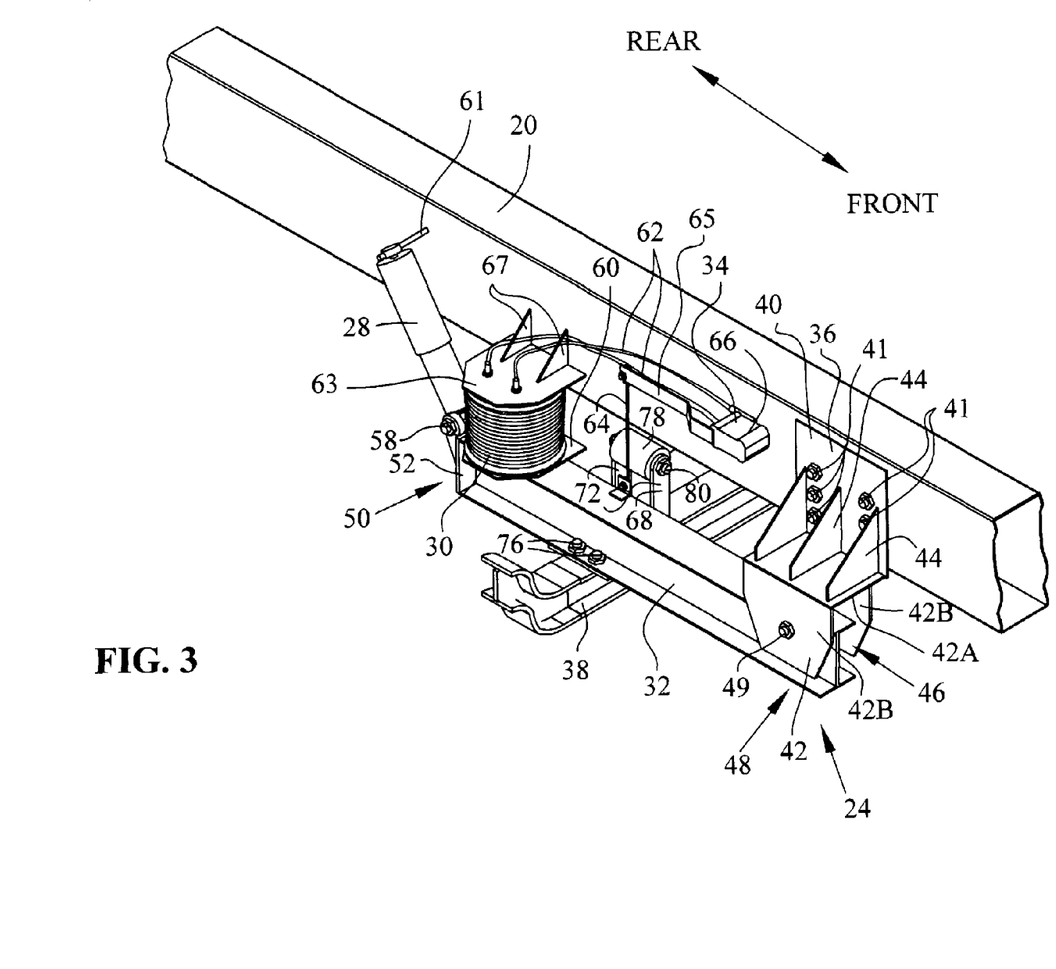
FIG. 3 is a perspective view of the front suspension of FIG. 2.
Figure 4:
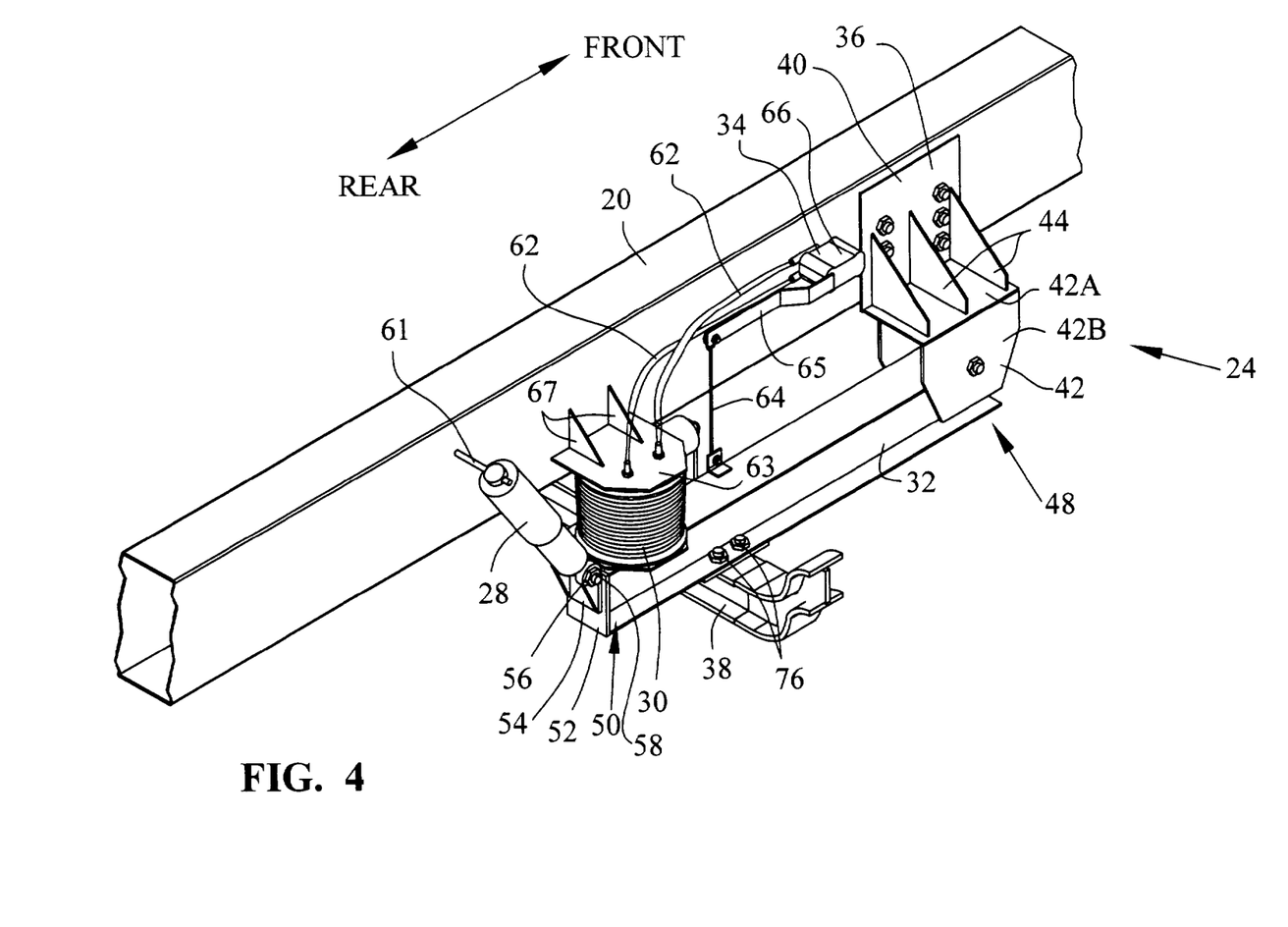
FIG. 4 is a rear perspective view of the front suspension depicted in FIG. 3.
Figures 5, 5A:
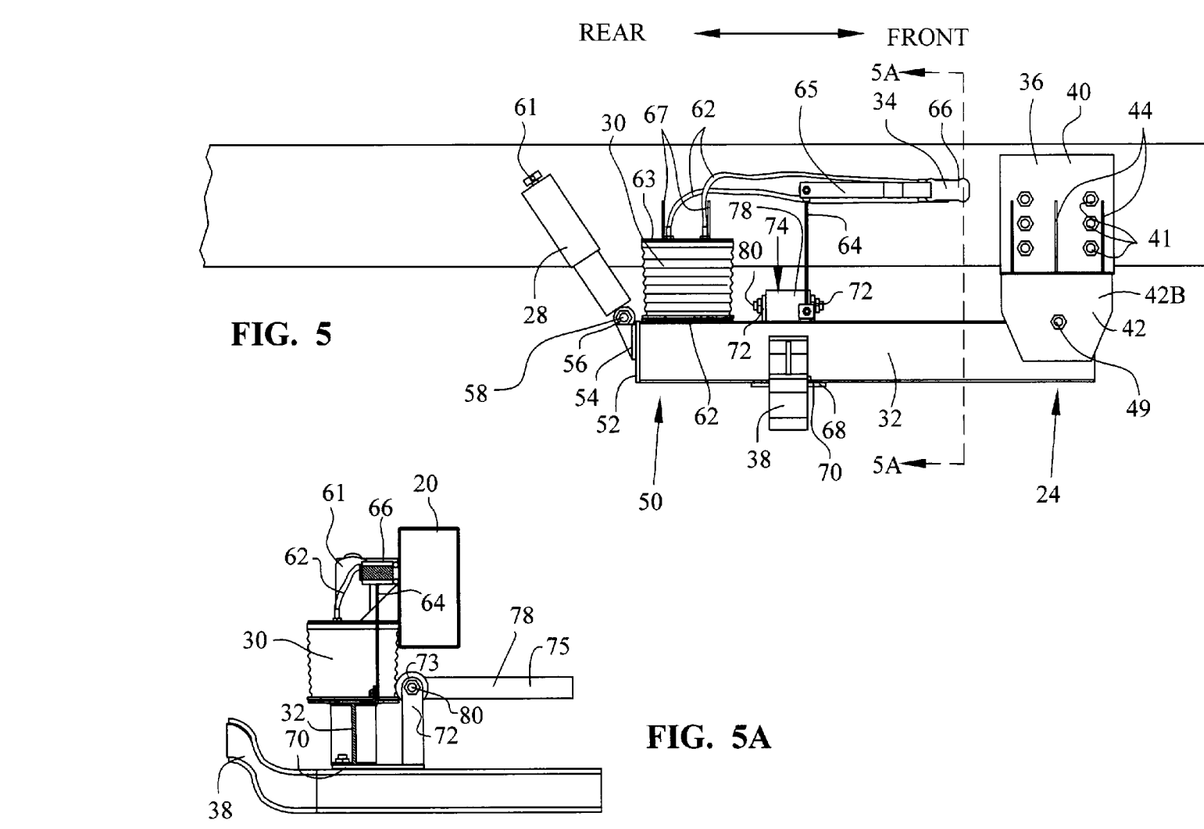
FIG. 5 is a side view of the front suspension depicted in FIG. 3.
FIG. 5A is a section view taken along the line labeled 5A of the front suspension depicted in FIG. 5.

FIGS. 3, 4, and 5 depict various views of the front suspension 24. The front suspension 24 generally includes a shock absorber 28, an air spring 30, a trailing arm 32, a pressure control valve 34, a bracket 36, and an axle 38.

In the embodiment shown, the bracket 36 includes an upper portion 40, a lower portion 42, and a plurality of gussets 44 each manufactured from a heavy steel. The upper portion 40 may be affixed to the frame 20 by way of any well known means. For example, in the embodiments shown, a plurality of bolts 41 are inserted through both the upper portion 40 and the frame 20 fastening the bracket 36 thereto. In the alternative, the upper portion 40 may be welded directly to the frame 20 in order to the secure the bracket 36 to the frame 20 in a more permanent manner.

Lower portion 42 is a generally U-shaped member having a base 42A and a pair of walls 42B with a space 46 therebetween. Lower portion 42 extends below the frame 20 and is generally coupled to the upper portion 40 by way of the gussets 44. The gussets 44 may be secured to both the upper portion 40 and the lower portion 42 by welding. As the gussets 44 extend along the flat surfaces of both the upper and the lower portions 40, 42, the gussets 44 provide a means of bracing the lower portions 42 against the upper portions 40.

The trailing arm 32 may take any form which is well known in the art. FIGS. 3, 4, and 5 depict an embodiment of the trailing arm 32 having the cross-sectional shape of an I-beam and being manufactured from heavy steel. The trailing arm 32 includes a first end 48 and a second end 50. The first end 48 of the trailing arm 32 includes an opening (not shown). First end 48 is located within space 46 of lower portion 42 of bracket 36. Lower portion 42 is secured to first end 48 by a bolt or other fasteners 49.

The second end 50 of the trailing arm 32 includes a plate 52 and a bracket 54 in FIG. 4. In this embodiment, the plate 52 is welded to the second end 50, providing a flat mounting surface to which the bracket 54 is attached. This secures the bracket 54 to the second end 50. The bracket 54 includes a pair of vertical portions 56 having a gap (not shown) located therebetween. As should be apparent to one with ordinary skill in the art, the usage of the plate 52 may not be necessary in alternative embodiments of the trailing arm 32 having cross-sections which vary from the I-beam shape depicted herein.

Referring still to FIGS. 3, 4, and 5, it can be seen that the shock absorber 28 extends vertically from the gap of the bracket 54 to the frame 20. The shock absorber 28 may be of any type commonly employed in the art, with the size being determined by the type of application in which the suspension is employed. Further, the shock absorber 28 may be mounted to both the gap and the frame 20 through any conventional mounting means. For example, in this embodiment, a bolt 61 fastens one end of the shock absorber 28 to the frame 20, while a second bolt 58 fastens the remaining end in the gap. It should be noted that any known fastening means may be substituted for the bolts 58, 61 in alternative embodiments. In addition, the shock absorber 28 is mounted at an angle so as to reduce stress at the mounting points and allow the ends of the shock absorber 28 to rotate as the trailing arm 32 moves relative to the frame 20. Furthermore, the mounting of the shock absorber 28 to the trailing arm 32 proximate the second end 50 alters the desirability of the ride provided by the front suspension 24.

The trailing arm 32 further includes a plate 60, which may be mounted thereto by way of any conventional means. In the embodiment shown, the plate 60 is welded to the top of the trailing arm 32 and comprises a substantially flat surface which supports the air spring 30. The air spring 30 may be of any type well known and is mounted to the plate 60 by way of any conventional means. Furthermore, an air spring mounting plate 63 including a pair of gussets 67 mount the air spring 30 to the frame 20, thereby retaining the air spring 30 between the frame 20 and the trailing arm 32.

Referring still to FIGS. 3, 4, and 5, a pressure control valve 34 is depicted as being mounted to the frame 20. In the embodiment depicted, the pressure control valve 34 includes a plurality of hoses 62, a rod 64, a leveling arm 65, and a valve control device 66, although any variation which satisfies the requirements of the application may be employed. The valve control device is affixed to the frame 20 with the leveling arm 65 extending horizontally therefrom. In addition, the rod 64 extends downwardly from the opposite end of the leveling arm 65. As should be apparent to one with ordinary skill in the art, the rod 64 may extend downward and be attached to any component of the front suspension 24 which matches the vertical travel of the trailing arm 32 as the trailing arm 32 moves relative to the frame 20. This arrangement allows the pressure control valve 34 to monitor the relative distance between the frame 20 and the trailing arm 32. Additionally, the hoses 62 extend between the valve control device 66 and the air spring 30.

Referring now to FIGS. 3, 4, 5, and 5A, the trailing arm 32 also has a sway bar bracket 68 attached thereto. In the embodiment shown, the sway bar bracket 68 includes a plate 70 and a pair of raised arms 72. The raised arms 72 are spaced apart and affixed to the plate 70 by way of welding and include a gap, indicated by numeral 74, located therebetween. The plate 70 may be affixed to trailing arm 32 in a variety of manners, such as by welding or through the use of bolts 76, as depicted in the present embodiment. The bolts 76 extend downward through both the plate 70 and the trailing arm 32 fastening these components to each other.

As best depicted in FIGS. 5 and 5A, a transverse beam 78 extends between the front suspension 24 located on the right side of vehicle 10 and the front suspension 24 located on the left side of vehicle 10. The transverse beam 78 includes an pair of ends 73 and a body 75 located therebetween. In the embodiment depicted, one of the ends 73 of the transverse beam 78 is located within the gap 74 and then retained therein with a fastener 80. As should be apparent, however, the transverse beam 78 may be retained within the gap 74 by use of any known means that achieve the desired results of the invention. The body 75 extends toward the front suspension (not shown) located on the other side of the vehicle with the second of the ends 73 being attached thereto in a similar manner.

The axle 38 (shown in FIGS. 3, 4, and 5) may be of any type known in the art. In one embodiment of the present invention, the axle 38 is affixed to the underside of the trailing arm 32 by way of bolts 76. The bolts 76 extend through the axle 38, in addition to both the plate 70 and the trailing arm 32 joining all three components together.

Figure 6:
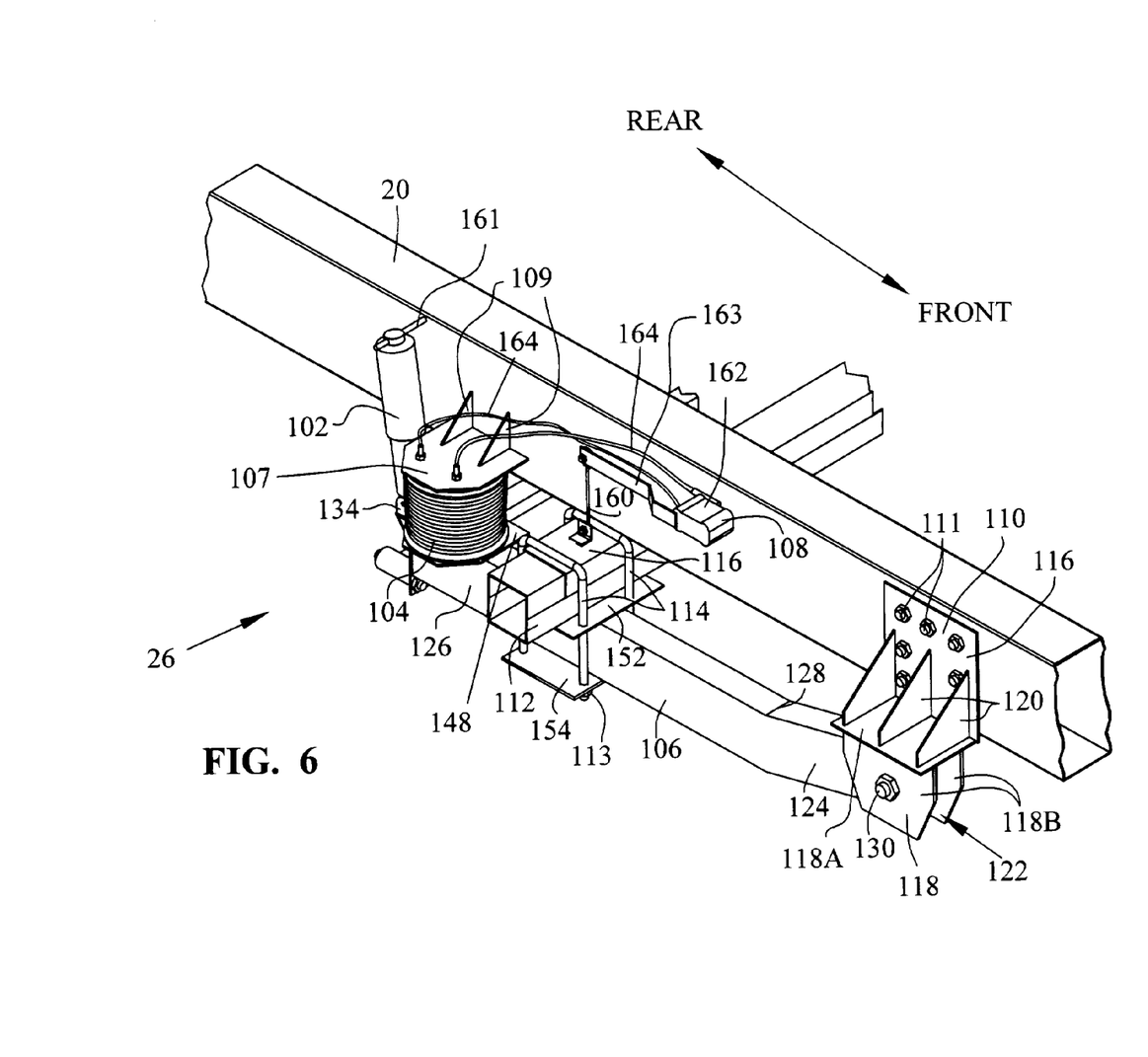
FIG. 6 is a front perspective view of the rear suspension of FIG. 2.
Figure 7:
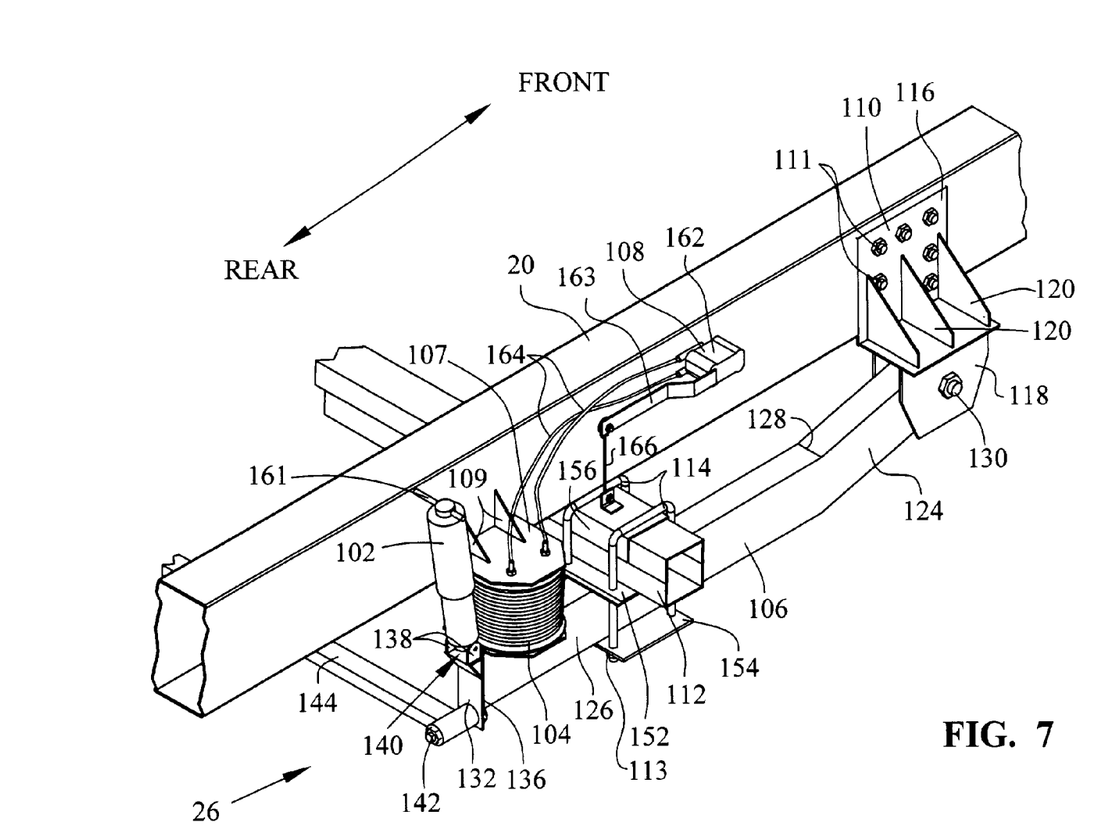
FIG. 7 is a rear perspective view of the rear suspension depicted in FIG. 6.
Figure 8:
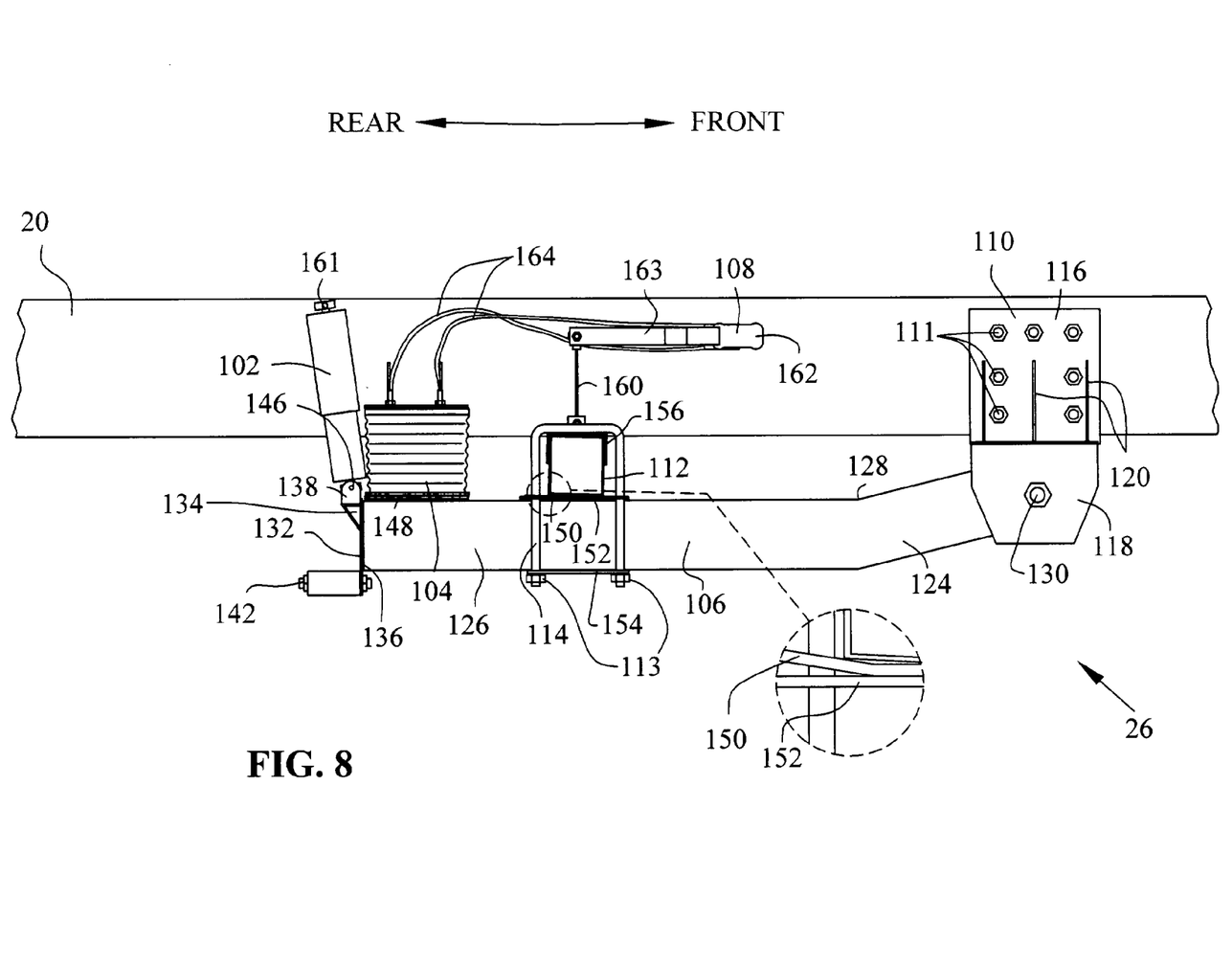
FIG. 8 is a side view of the rear suspension depicted in FIG. 6.

FIGS. 6, 7, and 8 each depict various views of the rear suspension 26. The rear suspension 26 includes a shock absorber 102, an air spring 104, a trailing arm 106, a pressure control valve 108, a bracket 110, an axle 112, and a plurality of U-bolts 114. In this embodiment, the rear suspension 26 is shown as providing a mechanism for coupling the drive wheels to the frame 20 in a rear wheel drive vehicle. It should be apparent that in a front wheel drive vehicle the rear suspension may replace the front suspension described above. For example, in a front wheel drive vehicle, the rear suspension 26, described below, would join the front wheels 12 to the frame 20.

In the embodiment of the rear suspension 26 depicted, the bracket 110 includes an upper portion 116, a lower portion 118, and a plurality of gussets 120 each manufactured from a heavy steel. The upper portion 116 may be affixed to the frame 20 by way of any well known means. For example, in the embodiments shown, a plurality of bolts 111 are inserted through both the upper portion 116 and the frame 20 fastening the bracket 110 thereto. In the alternative, the upper portion 116 may be welded directly to the frame 20 in order to the secure the bracket 110 to the frame 20 in a more permanent manner.

Lower portion 118 is a generally U-shaped member having a base 118A and a pair of walls 118B with a space 122 therebetween. Lower portion 118 extends below the frame 20 and is generally coupled to the upper portion 116 by way of the gussets 120. The gussets 120 may be secured to both the upper portion 116 and the lower portion 118 by welding. As the gussets 120 extend along the flat surfaces of both the upper and the lower portions 116, 118, the gussets 120 provide a means of bracing the lower portions 118 against the upper portions 116.

Referring still to FIGS. 6, 7, and 8, the trailing arm 106 has a rectangular cross-section and includes a first portion 124 and a second portion 126. The trailing arm 106 further includes an elbow 128 which divides the first portion 124 from the second portion 126 with the first portion 124 being located at an angle compared to the second portion 126.

A bracket 132 is welded to the second portion 126 of the trailing arm 106, in the embodiment depicted, although, as should be apparent, the bracket 132 may be affixed in any alternative manner. The bracket 132 includes a shock mounting portion 134 and a transverse beam mounting portion 136. The shock mounting portion 134 consists of a pair of walls 138 positioned parallel to each other and located above the trailing arm 106. The walls 138 are spaced apart forming a gap 140 located therebetween. The transverse beam mounting portion 136 consists primarily of a flat metallic plate including an opening (not shown) of sufficient size to receive a fastener 142.

In addition to extending through the opening in the transverse beam mounting portion 136, the fastener 142 also extends through a transverse beam 144, thereby securing the transverse beam 144 to the transverse beam mounting portion 136. In this embodiment, the transverse beam 144 has a substantially rectangular cross section with two openings located at the ends. The transverse beam 144 extends from the right rear suspension 26 to the left rear suspension 26 and is coupled to both in the above described manner.

As stated above, the rear suspension 26 also includes a shock absorber 102. The shock absorber 102 extends between the frame 20 and the trailing arm 106 and is attached to each. The shock absorber 102 is affixed to frame 20 by way of a conventional fastener 161 at one end with the other end affixed to bracket 132 at the shock mounting portion 134. In the embodiment depicted, this end is located within the gap 140 and retained therein by a fastener 146 extending therethrough. It should be noted that the mounting of the shock absorber 102 at the end of the trailing arm 106 opposite the end attached to the bracket 110 alters the smoothness of the ride provided by the rear suspension 26.

The trailing arm 106 further includes a plate 148, which may be mounted thereto by way of any conventional means. In the embodiment shown, the plate 148 is welded to the top of the trailing arm 106 and comprises a substantially flat surface which supports the air spring 104. The air spring 104 may be of any type well known and is mounted to the plate 148 by way of any conventional means. Furthermore, an air spring mounting plate 107 including a pair of gussets 109 mount the air spring 104 to the frame 20, thereby retaining the air spring 106 between the frame 20 and the trailing arm 106.

As seen best in FIG. 8, specifically in the circle with the magnified view, in the present embodiment of the invention, the rear suspension 26 also includes a wedge 150 affixed to the second portion 126 of the trailing arm 106. The wedge 150 has a slight slope, forming an incline directed forward, toward the first portion 124 of the trailing arm 106. The wedge 150 is included in this embodiment because the transmission (not shown) and the motor (not shown) are mounted in the vehicle at an angle. However, it should be apparent that the wedge 150 is not needed if the drive train is mounted horizontally.

Upper plate 152 is joined to the top surface of the wedge 150. The upper plate 152 is generally a flat plate with a rectangular shape having a width greater than the width of the trailing arm 106 is joined to the top surface of the wedge 150. The upper plate 152 includes four openings (not shown) each located proximate one of the corners of the upper plate 152. Additionally, in this embodiment, the upper plate 152 also includes an additional opening (not shown) located in the center, through which a fastening means (not shown) may be inserted and then countersunk, thereby securing the upper plate 152 to the wedge 150.

This embodiment of the invention also includes a lower plate 154. The lower plate 154 has a central body portion having a size and shape similar to that of the upper plate 152. The lower plate 154 also includes a curved portion along the inner and the outer edge. In addition, the lower plate 154 includes a plurality of openings (not shown) which copy the pattern of the openings present within the upper plate 152.

Referring again to FIGS. 6, 7, and 8, in order to mount the axle 112 to the trailing arm 106, the wedge 150 and the upper plate 152 are attached to the trailing arm 106, as discussed above. Next, the axle 112 is located across the top of the upper plate 152 such that the axle 112 extends in a direction perpendicular to the trailing arm 106. In this configuration, the axle 112 is located between the four corner openings of the upper plate 152. A crush plate 156 having a U-shape is then placed over the top surface of the axle 112. The opening of the crush plate 156 has a size substantially equal to the width of the axle 112 such that the crush plate 156 fits securely thereon. In the embodiment depicted, it should be noted that the dimensions of the outer surface of the crush plate 156 are comparable to the dimensions of the U-bolts 158 in such a manner so that the U-bolts 158 can cover the crush plate 156, as depicted. Furthermore, the openings located proximate the corners of both the upper plate 152 and the lower plate 154 are spaced apart a distance which is equivalent to the distance separating the legs of the U-bolts 158. This allows the U-bolts 158 to overlap the crush plate 156 and be inserted through the openings in both the upper plate 152 and the lower plate 154. Following the insertion of the U-bolts 158 into the lower plate 154, a plurality of locking nuts 113 are tightened, thereby drawing the U-bolts 158 downward toward the trailing arm 106. This creates a crush force between the crush plate 156 and the upper plate 152 securing the axle 112 to the trailing arm 106. Further, the crush plate 156 provides a relatively large area for spreading the crush force supplied by U-bolts 158 over the top surface of the axle 112 ensuring the axle 112 is not damaged when affixed to the trailing arm 106. Additionally, in one embodiment of the invention, four sleeves 153 comprising hollow tubes made of steel or a similar type material are located between the upper plate 152 and the lower plate 154 with the u-bolts 158 extending therethrough. In this manner, the sleeves 153 limit the crush force placed on the trailing arm 124 as the locking nuts 113 draw the upper plate 152 and the lower plate 154 together.

Referring still to FIGS. 3, 4, and 5, a pressure control valve 34 is depicted as being mounted to the frame 20. In the embodiment depicted, the pressure control valve 34 includes a plurality of hoses 62, a rod 64, a leveling arm 65, and a valve control device 66, although any variation which satisfies the requirements of the application may be employed. The valve control device is affixed to the frame 20 with the leveling arm 65 extending horizontally therefrom. In addition, the rod 64 extends downwardly from the opposite end of the leveling arm 65. As should be apparent to one with ordinary skill in the art, the rod 64 may extend downward and be attached to any component of the front suspension 24 which matches the vertical travel of the trailing arm 32 as the trailing arm 32 moves relative to the frame 20. This arrangement allows the pressure control valve 34 to monitor the relative distance between the frame 20 and the trailing arm 32. Additionally, the hoses 62 extend between the valve control device 66 and the air spring 30.

Referring still to FIGS. 6, 7, and 8, a pressure control valve 108 is mounted to the frame 20. In this embodiment, the pressure control valve 108 includes the same structure as the pressure control valve 34, described above, wherein a valve control 162 mounts to the frame 20 with a level arm 163 extending therefrom. A rod 160 extends between the level arm 162 and, in this embodiment, the crush plate 156. Additionally, similar to the pressure control valve 32, described above, the pressure control valve 108 includes a plurality of hoses 164 extending between the valve control 162 and the air spring 104, wherein vertical movement of the axle 112 relative to the frame 20 causes the pressure control valve 108 to alter the internal pressure of the air spring 104 as necessary.

Referring again to FIGS. 3 and 6, it can be seen that with both the front suspension 24 and the rear suspension 26, the brackets 36, 110 pivotally mounting the front ends of the trailing arms 32, 106 to the frame 20. In addition, the rear portions of the trailing arms 32, 106 are coupled to the frame 20 by way of the air springs 30, 104, which are mounted to the trailing arms 32, 106 rearward of the axles 38, 112 also mounted thereto.

The internal pressure of the air springs 30, 104 is controlled by pressure control valves 34, 108. The internal pressure of the air springs 30, 104 regulates the distance from the trailing arms 32, 106 to the frame 20, such that the greater the air pressure within each of the air springs 30, 104, the greater the distance between the respective trailing arm 32, 106 and the frame 20. Likewise, the converse is also true with a reduction of pressure in the air spring 30, 104 corresponding to a reduction in the distance separating the trailing arm 32, 106 from the frame 20.

Once the initial pressure of the air springs 30, 104 has been set to the desired level, thereby setting the initial distance between the trailing arms 32, 106 and the frame 20, the pressure control valves 34, 108 are coupled to the air spring 30, 104, as described above. The pressure control valves 34, 108 provide a mechanism for altering the internal pressure of each air spring 30, 104 as the vehicle travels along the road and encounters bumps and similar obstacles. A bump in the road causes the trailing arms 32, 106 to pivot upwards toward the frame 20. This movement causes the leveling arms 65, 163 to pivot above the horizontal which in turn begins reducing pressure in the air springs 30, 104 thereby decreasing the relative distance between the trailing arms 32, 106 and the frame 20. This reduction of distance reduces the vertical travel of the frame 20 in comparison to the trailing arms 32, 106 and gives the passengers a more smooth ride. Furthermore, the pressure control valves 34, 108 also increase pressure within the air springs 30, 104 when depressions in the road cause the trailing arms 32, 106 to lower, creating more distance between the arms 32, 106 and the frame 20, again facilitating a smooth ride for the passengers.

In addition, the inclusion of the transverse beams 78, 144 on the front suspension 24 and the rear suspension 26, respectively, further increases the smoothness of the ride provided by the suspension 22 of the present invention. The lateral force provided by each transverse beam 78, 144 is centered on the underside of each arm 32, 106. This is accomplished in the front suspension 24 even though the transverse beam 78 is located above the trailing arm 32. The stabilizing force of the transverse beam 78 is applied to the underside of the trailing arm 32 due to the mounting of the transverse beam bracket 68 to the underside of the trailing arm 32. Likewise, in the rear suspension 26 the transverse beam 144 is also located below the trailing arm 106. In lowering the location at which the force of the beams 78, 144 is applied to the trailing arms 32, 106, the forces caused by the loss of traction in any wheel 12, 14 are shared more evenly between the left side and the right side suspensions thereby increasing the smoothness of the ride of the vehicle 10. Furthermore, the mounting of the beams 78, 144 to the trailing arms 32, 106 lowers the overall center of gravity of the suspension 22 thereby improving the smoothness of the ride provided.

While this invention has been described with reference to specific embodiments, the present invention may be further modified within the spirit and scope of this disclosure. Accordingly, the scope of the invention is limited only by the terms of the appended claim and equivalents thereof.

We claim:

1. A vehicle suspension system for mounting a ground engaging wheel to a vehicle frame including:
   a trailing arm having a first end and a second end, the first end of the trailing arm being mounted to the frame; and
   a transverse beam mounted to the trailing arm rearward of the first end;
   wherein the transverse beam is able to pivot with respect to the trailing arm at a pivot point located at a vertical height positioned below the trailing arm in order to transfer a stabilizing force to the trailing arm from the transverse beam at a height no higher than the underside of the trailing arm.

2. The vehicle suspension system as set forth in claim 1 further including a first bracket and a second bracket, the first bracket mounting the first end of the trailing arm to the frame and the second bracket mounting the transverse beam to the trailing arm.

3. The vehicle suspension system as set forth in claim 2 further including an air spring and a shock absorber, each having a first end and a second end, the first end of each being mounted to the frame and the second end for each being mounted to the trailing arm.

4. The vehicle suspension system as set forth in claim 3 wherein the second end of the shock absorber is located rearward of the second end of the air spring.

5. The vehicle suspension system as set forth in claim 4 wherein the first end of the shock absorber is located rearward of the second end of the shock absorber.

6. The vehicle suspension system as set forth in claim 3 wherein the shock absorber is also mounted to the second bracket.

7. The vehicle suspension system as set forth in claim 4 wherein the second end of the shock absorber is located above the transverse beam.

8. A vehicle suspension system for mounting a plurality of ground engaging wheels to a vehicle frame including a front suspension and a rear suspension:

the front suspension comprising:
- a trailing arm including a first end and a second end, the first end being mounted to the frame;
- a shock absorber mounted to the second end;
- an air spring being located between the first end and the second end; and
- a transverse beam mounted to the trailing arm and extending laterally beneath the vehicle and providing a force for resisting lateral movement of the trailing arm; and the rear suspension comprising:
- a trailing arm including a first end and a second end, the first end being mounted to the frame;
- a shock absorber mounted to the second end;
- an air spring being located between the first end and the second end;
- a transverse beam mounted to the trailing arm below the trailing arm and extending laterally beneath the vehicle and providing a force for resisting lateral movement of the trailing arm; and
- a bracket having a first mounting portion connected to the shock absorber and a second mounting portion connected to the transverse beam.

9. The vehicle suspension system as set forth in claim 8 wherein the first portion of the bracket is located above the second portion of the bracket.

10. A vehicle suspension system for mounting a ground engaging wheel to a vehicle frame including:
- a trailing arm having a first end and a second end, the first end of the trailing arm being mounted to the frame by a first bracket;
- a transverse beam mounted to the trailing arm by a second bracket at a location rearward of the first end to transfer a stabilizing force to the trailing arm at a height no higher than the underside of the trailing arm, wherein the transverse beam is able to pivot with respect to the trailing arm;
- an air spring and a shock absorber, each having a first end and a second end, the first end of each being mounted to the frame and the second end of each being mounted to the trailing arm; and
- wherein the second end of the shock absorber is located rearward of the second end of the air spring.

11. The vehicle suspension system as set forth in claim 10 wherein the first end of the shock absorber is located rearward of the second end of the shock absorber.

12. The vehicle suspension system as set forth in claim 10 wherein the second end of the shock absorber is located above the transverse beam.

* * * * *